(12) United States Patent
Jung et al.

(10) Patent No.: US 8,067,745 B2
(45) Date of Patent: Nov. 29, 2011

(54) X-RAY DETECTOR AND MANUFACTURING METHOD THEREOF

(75) Inventors: Kwan-Wook Jung, Suwon-si (KR); Kyung-Sang Goo, Hwaseong-si (KR); Dae-Ho Choo, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 259 days.

(21) Appl. No.: 12/354,135

(22) Filed: Jan. 15, 2009

(65) Prior Publication Data

US 2009/0202042 A1   Aug. 13, 2009

(30) Foreign Application Priority Data

Feb. 12, 2008 (KR) .................. 10-2008-0012632

(51) Int. Cl.
 *H01L 27/146* (2006.01)
 *H05G 1/64* (2006.01)
(52) U.S. Cl. .................... 250/370.09; 378/98.8
(58) Field of Classification Search ........... 250/370.09, 250/370.11, 370.13; 378/98.2, 98.8
See application file for complete search history.

(56) References Cited

U.S. PATENT DOCUMENTS

| | | | |
|---|---|---|---|
| 6,518,557 B1* | 2/2003 | Izumi et al. | 250/208.1 |
| 2002/0079458 A1* | 6/2002 | Zur | 250/370.11 |
| 2003/0010923 A1* | 1/2003 | Zur | 250/370.09 |
| 2004/0217294 A1* | 11/2004 | Zur | 250/370.09 |
| 2007/0158574 A1* | 7/2007 | Petrillo et al. | 250/370.13 |
| 2008/0011959 A1* | 1/2008 | Thorne | 250/370.09 |
| 2009/0096052 A1* | 4/2009 | Heringa et al. | 257/435 |
| 2009/0152664 A1* | 6/2009 | Klem et al. | 257/440 |

* cited by examiner

*Primary Examiner* — Mark R Gaworecki
(74) *Attorney, Agent, or Firm* — Cantor Colburn LLP

(57) ABSTRACT

An X-ray detector includes; a panel having a plurality of photo-detecting pixels generating electrical signals in response to the detection of X-rays, a gate driver providing a gate signal to the plurality of photo-detecting pixels, wherein the photo-detecting pixels output the electrical signals in response to the gate signal, a readout integrated circuit reading out the electrical signal in response to the gate signal, a main board including a controller receiving the electrical signal and converting the electrical signal to an image signal, a film attached to the panel and the main board, the film including a signal line electrically connecting the readout integrated circuit to the panel and main board, wherein the readout integrated circuit is mounted on the film, and a shielding layer covering the film and comprising a conductive material, wherein the shielding layer prevents externally applied electromagnetic signals from passing through the film.

18 Claims, 4 Drawing Sheets

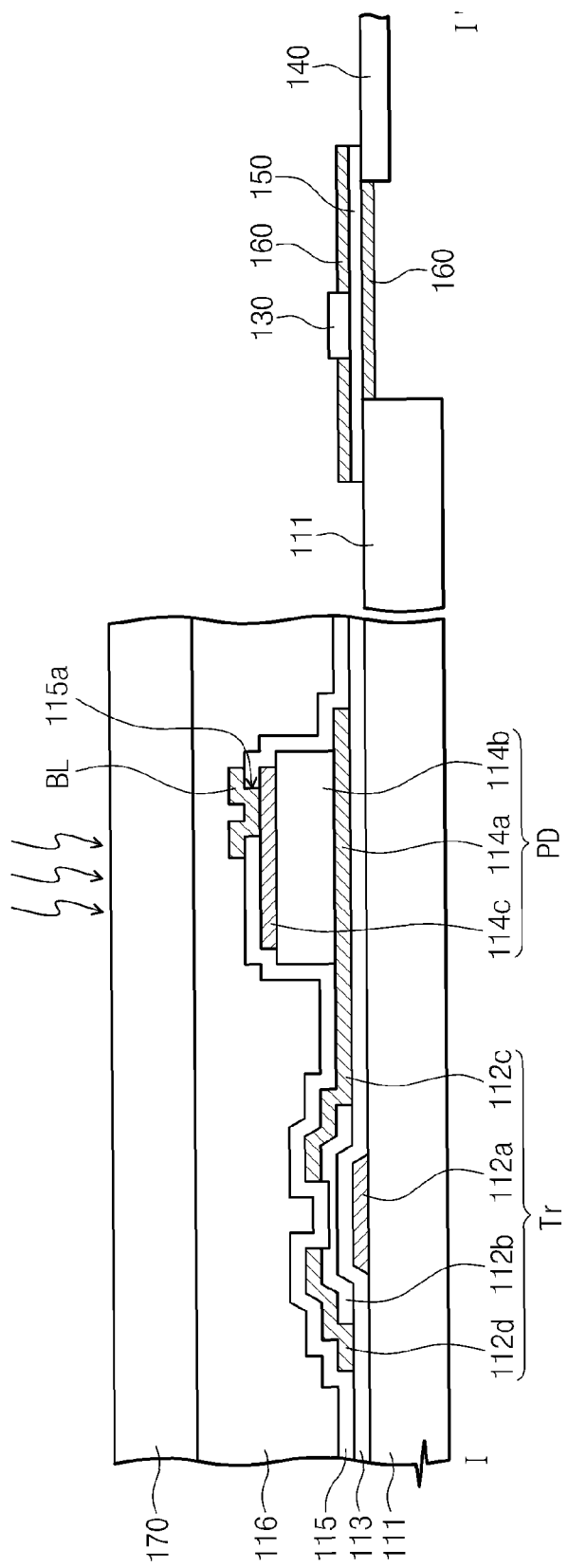

X-RAY DETECTOR AND MANUFACTURING METHOD THEREOF

This application claims priority to Korean Patent application No. 2008-12632, filed on Feb. 12, 2008, and all the benefits accruing therefrom under 35 U.S.C. §119, the contents of which in its entirety are herein incorporated by reference.

BACKGROUND OF THE INVENTION

1. Field of the Invention

The present invention relates to an X-ray detector. More particularly, the present invention relates to an X-ray detector capable of removing noise caused by electronic interference.

2. Description of the Related Art

In general, an X-ray detector is used in a medical diagnostic instrument to provide an X-ray image of a subject to a display apparatus by detecting the X-ray image produced by the absorption and transmission of X-rays through the subject.

Presently, a flat panel X-ray detector employing digital radiography ("DR"), which does not require photographic film, is extensively used. The flat panel X-ray detector employing DR includes a plurality of photo-detecting pixels provided in a flat panel to detect X-rays generated by an X-ray generator. As used herein, X-rays, refer to electromagnetic radiation with a wavelength from about 0.01 nm to about 10 nm. Each photo-detecting pixel includes a photo diode that detects X-rays generated from the X-ray generator and outputs electric signals, and a switching device that switches the electric signals output from the photo diode.

A readout integrated circuit and a gate driver are provided at an outer portion of the flat panel. The readout integrated circuit reads out the electric signals from the flat panel and the gate driver sequentially turns on switching devices aligned in a row direction to allow the readout integrated circuit to sequentially read out the electric signals from photo-detecting pixels aligned in the row direction. The electric signals output from the readout integrated circuit are processed through a controller provided in a main board, and then converted into image signals. The converted image signals are provided to a display apparatus to display X-ray images.

In general, the readout integrated circuit is mounted on a film that connects the flat panel to the main board. The film is provided with a signal line that electrically connects the flat panel to the main board. However, the signals, which are input into or output from the readout integrated circuit, are distorted due to electronic interference generated from the main board or external electronic appliances. As a result, the display apparatus, which displays the image signals provided from the X-ray detector, displays images having noise, thereby deteriorating display quality of the X-ray image.

BRIEF SUMMARY OF THE INVENTION

Therefore, the present invention provides an X-ray detector capable of removing noise caused by electronic interference.

The present invention also provides a method of manufacturing the X-ray detector.

In one exemplary embodiment, an X-ray detector includes; a panel comprising a plurality of photo-detecting pixels configured to generate electrical signals in response to the detection of X-rays, a gate driver configured to provide a gate signal to the plurality of photo-detecting pixels, wherein the photo-detecting pixels output the electrical signals in response to the gate signal, a readout integrated circuit configured to read out the electrical signal output from the photo-detecting pixels in response to the gate signal, a main board including a controller configured to receive the electrical signal from the readout integrated circuit and convert the electrical signal to an image signal, a film attached to the panel and the main board, the film including a signal line electrically connecting the readout integrated circuit to the panel and the main board, wherein the readout integrated circuit is mounted on the film; and a shielding layer covering the film and comprising a conductive material, wherein the shielding layer is configured to prevent externally applied electromagnetic signals from passing through the film.

In another exemplary embodiment, a method of manufacturing an X-ray detector including a panel provided with photo-detecting pixels that detect an X-ray by converting the X-ray into an electrical signal, a readout integrated circuit that reads out the electrical signal output from the photo-detecting pixels, and a main board provided with a controller that receives the electrical signal from the readout integrated circuit to convert the electrical signal to an image signal, the method includes; providing a film, mounting the readout integrated circuit on the film, attaching the film to the panel and the main board to electrically connect the readout integrated circuit to the panel and the main board and disposing a shielding layer comprising a conductive material on the film, wherein the shielding layer is configured to protect signals passing through the film from external electronic interference.

According to the above, the shielding layer is formed on the outer surface of the film onto which the readout integrated circuit is mounted, so that signals, which are input into or output from the readout integrated circuit, may be prevented from being distorted by external electronic interference. As a result, the display apparatus may display the X-ray image without forming a line-defect on the X-ray image.

BRIEF DESCRIPTION OF THE DRAWINGS

The above and other advantages of the present invention will become readily apparent by reference to the following detailed description when considered in conjunction with the accompanying drawings wherein:

FIG. 2 is a cross-sectional view taken along line I-I' shown in FIG. 1;

DETAILED DESCRIPTION OF THE INVENTION

Figure 1:
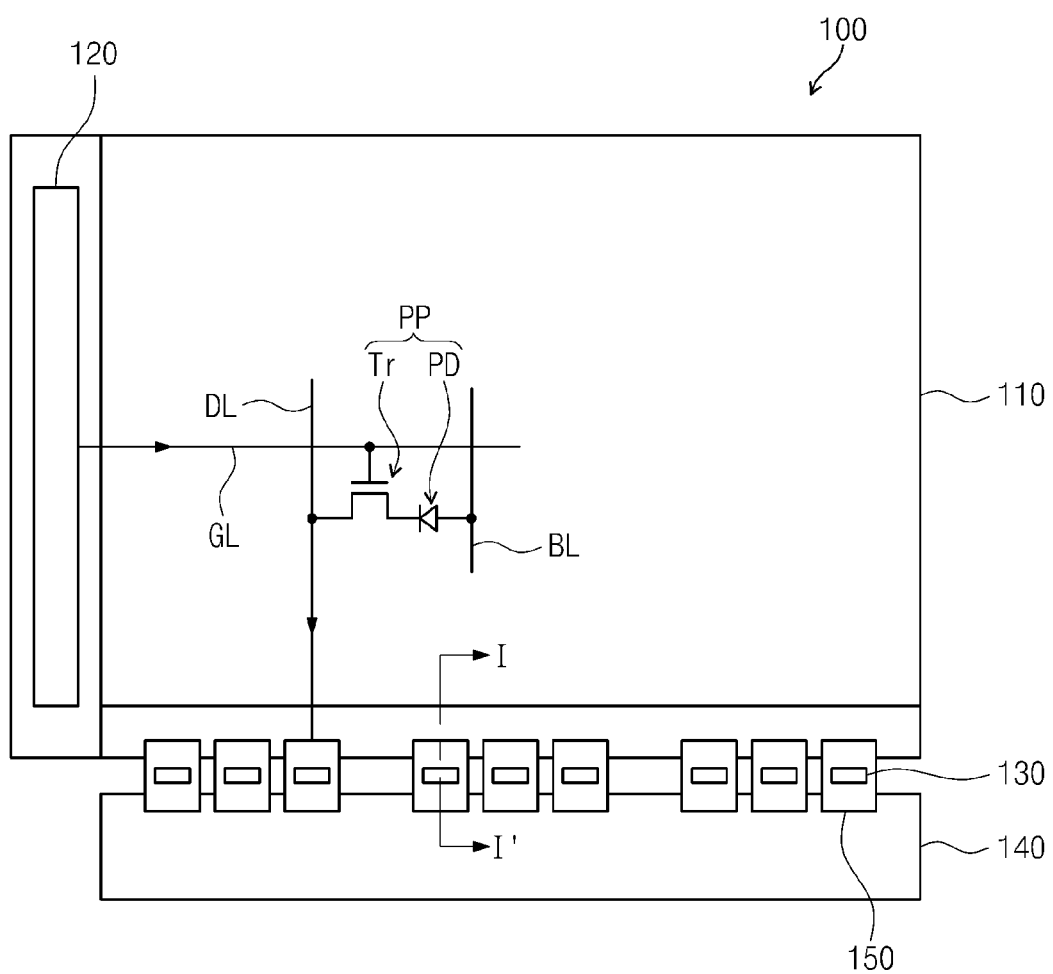
FIG. 1 is a top plan schematic view showing an exemplary embodiment of an X-ray detector according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

FIG. 1 is a top plan schematic view showing an exemplary embodiment of an X-ray detector according to the present invention, and FIG. 2 is a cross-sectional view taken along line I-I' shown in FIG. 1.

Referring to FIG. 1, the X-ray detector 100 includes a panel 110, a gate driver 120, a readout integrated circuit 130, a main board 140 and a film 150. The panel 110 includes a plurality of photo-detecting pixels, one exemplary embodiment of which is illustrated as photo-detecting pixel PP, each of which detects X-rays output from an X-ray generator (not shown) by converting the detected X-rays into the electric signals. In one exemplary embodiment, the photo-detecting pixels PP are aligned in the form of a matrix in the panel 110.

Each of the photo-detecting pixels PP includes a photodiode PD and a transistor Tr. The photodiode PD detects the X-rays generated from the X-ray generator and converts the X-rays into electric signals. A first electrode of the photodiode PD is connected to an input, or source, electrode of the transistor Tr, and a second electrode of the photodiode PD is connected to a bias line BL to which a bias voltage is applied. Meanwhile, a control, or gate, electrode of the transistor Tr is electrically connected to the gate driver 120 through a gate line GL, and an output, or drain, electrode of the transistor Tr is electrically connected to the readout integrated circuit 130 through a data line DL.

As shown in FIG. 2, the panel 110 has a base substrate 111 on which the photo-detecting pixels PP are arranged. Although a plurality of photo-detecting pixels PP is formed on the base substrate 111, only one photo-detecting pixel PP is shown in FIG. 2.

Referring to FIG. 2, a control electrode 112a of the transistor Tr is formed on the base substrate 111. In one exemplary embodiment, the control electrode 112a includes a metal layer substantially similar to that of the gate line GL (see, FIG. 1). The control electrode 112a is covered with a gate insulating layer 113 on which an active layer 112b of the transistor Tr is formed. An input electrode 112c and an output electrode 112d of the transistor Tr are formed on the active layer 112b. The input electrode 112c is spaced apart from the output electrode 112d by a predetermined distance.

In the present exemplary embodiment, the input electrode 112c of the transistor Tr is integrally formed with a first electrode 114a of the photodiode PD, so that they are electrically connected to each other. Alternative exemplary embodiments include configurations wherein the input electrode 112c and the first electrode 114a may be separately formed and then subsequently electrically connected. A silicon layer 114b is formed on the first electrode 114a. Although not shown in the FIG. 2, exemplary embodiments of the silicon layer 114b include configurations wherein the silicon layer 114b may have a stacked structure in which an n-type silicon layer, an intrinsic silicon layer and a p-type silicon layer are sequentially stacked. A second electrode 114c including a transparent conductive layer, exemplary embodiments of which include indium tin oxide ("ITO") and indium zinc oxide ("IZO"), is formed on the silicon layer 114b while facing the first electrode 114a.

The photodiode PD and the transistor Tr having the above-mentioned structure are provided on the base substrate 111 and covered with a protective layer 115. The protective layer 115 has a contact hole 115a through which the second electrode 114c of the photodiode PD is exposed. The bias line BL is electrically connected to the second electrode 114c of the photodiode PD through the contact hole 115a.

In addition, an insulating layer 116 is provided on the protective layer 115 to cover the bias line BL and to planarize a surface of the panel 110. A scintillator 170 is provided on an upper surface of the panel 110, that is, on the insulating layer 116. The scintillator 170 receives X-rays from the X-ray generator and converts the X-ray into a light detectable by the photodiode PD. The photodiode PD detectable light is then output toward the panel 110. In one exemplary embodiment the scintillator 170 may convert the X-rays into green light having a wavelength of 550 nm, i.e., light in the visible spectrum. In one exemplary embodiment, the scintillator 170 may include cesium iodide.

Referring again to FIG. 1, the gate driver 120 provides gate signals to the photo-detecting pixels formed on the panel 110. In detail, when the gate signal is applied to the gate line GL, the transistor Tr is turned on and the electric signal supplied from the photodiode PD is output through the output electrode 112d to the data line DL. The electric signal output from the output electrode 112d is provided to the readout integrated circuit 130 through the data line DL. In the present exemplary embodiment, the gate driver 120 is prepared in the form of an integrated circuit ("IC") and is mounted on one side of the panel 110. In another exemplary embodiment, the gate driver 120 may be integrally formed with the panel 110 through a thin film forming process.

The readout integrated circuit 130 reads out the electric signal, which is output from the photo-detecting pixel PP that has been turned on in response to the gate signal. The main board 140 is provided with a control circuit (not shown) that receives the electric signal from the readout integrated circuit 130 to convert the electric signal to the image signal. The image signal generated from the control circuit is provided to a display apparatus (described in more detail with respect to FIG. 4). Thus, the image photographed by the X-ray generator may be displayed on the display apparatus. The readout integrated circuit 130 is mounted on the film 150 and the film 150 is attached to the panel 110 and the main board 140.

As shown in FIG. 2, top and bottom surfaces of the film 150 are covered with shielding layers 160. The shielding layers 160 may be applied after the readout integrated circuit 130 is mounted on the film 150. The shielding layers 160 shield electronic interference provided to the film 150 from the exterior. In one exemplary embodiment of the present invention, the shielding layers 160 may be grounded. Exemplary embodiments also include configurations wherein the shielding layers 160 may include copper thin films.

Figure 3A:
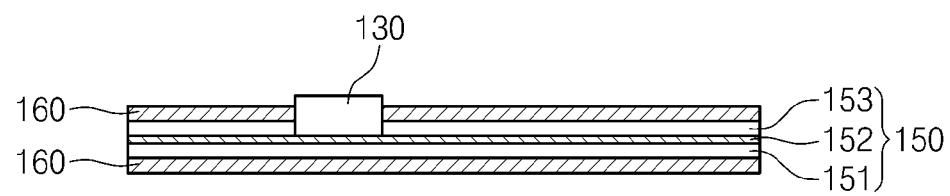
FIG. 3A is a cross-sectional view showing an exemplary embodiment of the structure of a film illustrated in FIG. 1.

FIG. 3A is a detailed cross-sectional view showing an exemplary embodiment of the structure of the film illustrated in FIG. 1.

Referring to FIG. 3A, the film 150 includes a first insulating layer 151, a signal line 152 and a second insulating layer 153. The signal line 152 is provided on the first insulating layer 151 to electrically connect the readout integrated circuit 130 to the data line DL provided on the panel 110 and the control circuit provided on the main board 140. The second insulating layer 153 is aligned in opposition to the first insulating layer 151 to cover the signal line 152 provided on the first insulating layer 151.

Meanwhile, the shielding layers 160 cover the outer surfaces of the first and second insulating layers 151 and 153 in order to prevent the signals transferred through the signal line 152 from being distorted by the external electronic interference. Thus, if the film 150 is covered with the shielding layers 160, the display apparatus may display the X-ray image based on the image signals provided from the X-ray detector 100 without deteriorating the display quality.

Figure 3B:
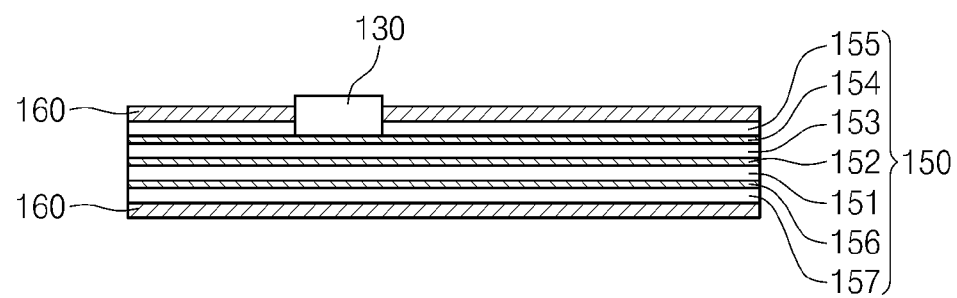
FIG. 3B is a cross-sectional view showing another exemplary embodiment of the structure of the film according to the present invention.

FIG. 3B is a cross-sectional view showing another exemplary embodiment of the film structure according to the present invention. Referring to FIG. 3B, the film 150 according to another embodiment of the present invention includes a first insulating layer 151, a signal line 152, a second insulating layer 153, a first ground interconnection 154, a third insulating layer 155, a second ground interconnection 156, and a fourth insulating layer 157.

The first ground interconnection 154 is provided on an outer surface of the second insulating layer 153 and may be grounded. The first ground interconnection 154 is covered with the third insulating layer 155 facing the second insulating layer 153. Meanwhile, the second ground interconnection 156 is formed on an outer surface of the first insulating layer 151 and may be grounded. The second ground interconnection 156 is covered with the fourth insulating layer 157 facing the first insulating layer 151.

Similar to the previous exemplary embodiment, shielding layers 160 are formed on outer surfaces of the third and fourth insulating layers 155 and 157 to shield electronic interference from the exterior. In one exemplary embodiment, the shielding layers 160 may be connected to the first or second ground interconnection 154 or 156, so that the shielding layers 160 may be grounded. In one exemplary embodiment, the shielding layers 160 may be electrically connected to a ground terminal of the readout integrated circuit 130.

Figure 4:
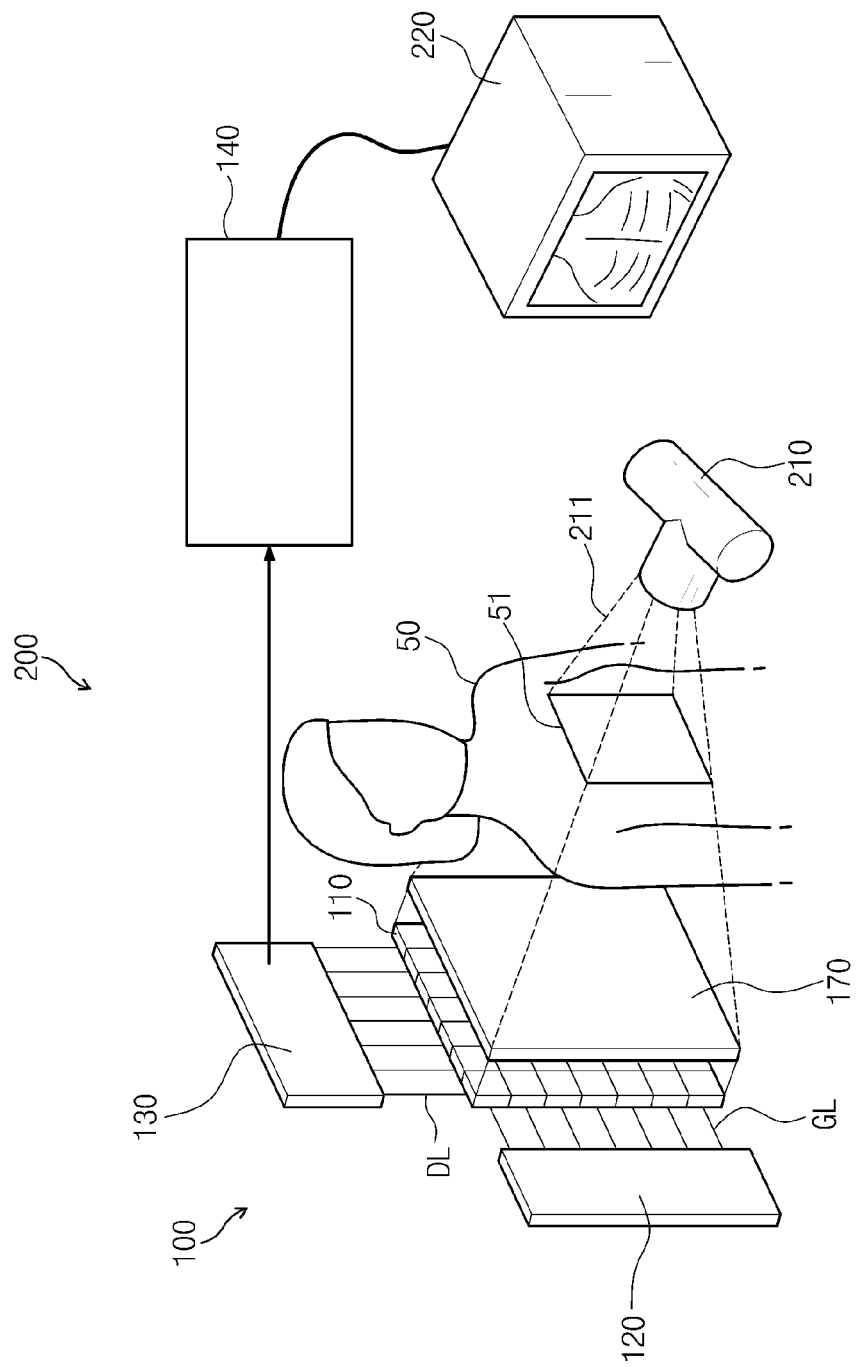
FIG. 4 is a view showing an exemplary embodiment of an X-ray system having the exemplary embodiment of an X-ray detector illustrated in FIG. 1.

FIG. 4 is a view showing an exemplary embodiment of an X-ray system having the exemplary embodiment of an X-ray detector illustrated in FIG. 1.

Referring to FIG. 4, the X-ray system 200 includes an X-ray generator 210 that generates X-rays 211 in a direction toward a predetermined region 51 of a patient 50 (that is, an inspection region), an X-ray detector 100 that detects X-rays 211 which have passed through the predetermined region 51 of the patient 50, and a display apparatus 220 that displays an image by receiving image signals corresponding to the X-rays 211 detected by the X-ray detector 100. Although the present exemplary embodiment of an X-ray system 200 is described with respect to the imaging of a patient 50, it would be clear to one of ordinary skill in the art that such an exemplary embodiment of an X-ray system 200 may be applied to a wide range of applications wherein X-ray imaging is desired, e.g., luggage inspection, etc.

In such an X-ray system 200, if the X-ray is irradiated onto the predetermined region 51 of the patient 50, the scintillator 170 provided between the panel 110 of the X-ray detector 100 and the patient 50 converts the X-ray 211, which has passed through the patient 50, into green light to provide the green light to the panel 110.

Since the X-ray detector 100 has been described in detail with reference to FIGS. 1 and 2, it will not be further described below.

The X-ray detector 100 obtains image signals corresponding to X-rays 211, which have passed through the patient 50, and then provides the image signal to the display apparatus 220. Accordingly, the display apparatus 220 may display the X-ray images corresponding to the image signals in real time. As an example of the present invention, the display apparatus 220 may include a liquid crystal display ("LCD"), and various other display types as would be known to one of ordinary skill in the art.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An X-ray detector comprising:
   a panel comprising a plurality of photo-detecting pixels configured to generate electrical signal in response to the detection of X-rays;
   a gate driver configured to provide a gate signal to the plurality of photo-detecting pixels, wherein the photo-detecting pixels output the electrical signal in response to the gate signal;
   a readout integrated circuit configured to read out the electrical signal output from the photo-detecting pixels in response to the gate signal;
   a main board including a controller configured to convert an output from the readout integrated circuit to an image signal;
   a film attached to the panel and the main board, the film including a signal line electrically connecting the readout integrated circuit to the panel and the main board, wherein the readout integrated circuit is mounted on the film; and
   a shielding layer covering the film and comprising a conductive material.

2. The X-ray detector as claimed in claim 1, wherein the shielding layer receives a ground voltage.

3. The X-ray detector as claimed in claim 2, wherein the shielding layer comprises a copper thin film.

4. The X-ray detector as claimed in claim 1, wherein the film comprises:
   a first insulating layer on which the signal line is provided; and
   a second insulating layer covering the signal line on the first insulating layer.

5. The X-ray detector as claimed in claim 4, wherein the shielding layer covers outer surfaces of the first and second insulating layers.

6. The X-ray detector as claimed in claim 4, wherein the film comprises:
   a first ground interconnection disposed on an outer surface of the first insulating layer;
   a third insulating layer covering the first ground interconnection;
   a second ground interconnection disposed on an outer surface of the second insulating layer; and
   a fourth insulating layer covering the second ground interconnection.

7. The X-ray detector as claimed in claim 6, wherein the shielding layer covers outer surfaces of the third and fourth insulating layers.

8. The X-ray detector as claimed in claim 1, further comprising a scintillator disposed on the panel and configured to convert the X-rays into a light having a wavelength band detectable by the photo-detecting pixels.

9. The X-ray detector as claimed in claim 8, wherein each of the photo-detecting pixels comprises;
   a photodiode configured to detect the light output from the scintillator and output the electrical signal corresponding to the detected light; and
   a switching device configured to control the passage of the electrical signal from the photodiode through an input electrode and out an output electrode.

10. The X-ray detector as claimed in claim 9, wherein the switching device comprises a transistor, and the panel further comprises:
    a gate line connected to a control electrode of the transistor and configured to receive the gate signal from the gate driver; and
    a data line connected to an output electrode of the transistor and configured to provide the electrical signal to the readout integrated circuit.

11. A method of manufacturing an X-ray detector including a scintillator configured to convert X-rays into a light having a predetermined wavelength band, a panel provided with photo-detecting pixels that detect the light by converting the light into an electrical signal, a readout integrated circuit that reads out the electrical signal output from the photo-detecting pixels, and a main board provided with a controller that converts an output from the readout integrated circuit to an image signal, the method comprising:
    providing a film;
    mounting the readout integrated circuit on the film;
    attaching the film to the panel and the main board to electrically connect the readout integrated circuit to the panel and the main board; and
    disposing a shielding layer comprising a conductive material on the film, wherein the shielding layer is configured to protect signals passing through the film from external electronic interference.

12. The method as claimed in claim 11, wherein the shielding layer comprises a copper thin film.

13. The method as claimed in claim 12, wherein the providing of the film comprises:
    disposing a first insulating layer at an upper surface of a signal line, wherein the signal line is configured to transmit the electrical signal; and
    disposing a second insulating layer on a lower surface of the signal line to cover the signal line.

14. The method as claimed in claim 13, wherein the shielding layer covers outer surfaces of the first and second insulating layers.

15. The method as claimed in claim 13, further comprising:
    disposing a first ground interconnection on an outer surface of the first insulating layer;
    disposing a third insulating layer covering the first ground interconnection;
    disposing a second ground interconnection on an outer surface of the second insulating layer; and
    disposing a fourth insulating layer covering the second ground interconnection.

16. The method as claimed in claim 15, wherein the shielding layer covers outer surfaces of the third and fourth insulating layers.

17. An X-ray system comprising:
    an X-ray generator configured to generate X-rays;
    a scintillator configured to convert X-rays from the X-ray generator into a light having a predetermined wavelength band;
    a panel comprising a plurality of photo-detecting pixels configured to generate electrical signal in response to the detection of the light;
    a gate driver configured to provide a gate signal to the plurality of photo-detecting pixels, wherein the photo-detecting pixels output the electrical signal in response to the gate signal;
    a readout integrated circuit configured to read out the electrical signal output from the photo-detecting pixels in response to the gate signal;

a main board including a controller configured to convert an output from the readout integrated circuit to an image signal;

a film attached to the panel and the main board, the film including a signal line electrically connecting the readout integrated circuit to the panel and the main board, wherein the readout integrated circuit is mounted on the film;

a shielding layer covering the film and comprising a conductive material;

a display apparatus connected to the main board and configured to display an image corresponding to an image signal supplied from the main board.

18. The X-ray system as claimed in claim 17, wherein the shielding layer is configured to prevent externally applied electromagnetic signals from passing through the film.

* * * * *